Patented Nov. 3, 1953

2,658,056

UNITED STATES PATENT OFFICE 2,658,056

POLYMERIC N-METHACRYLYL MORPHOLINE

George E. Ham, Dayton, Ohio, assignor to Monsanto Chemical Company, St. Louis, Mo., a corporation of Delaware No Drawing. Application February 27, 1948, Serial No. 11,870

1 Claim. (Cl. 260—88.3)

This invention relates to new chemical compounds which have valuable and unusual properties as are more fully described hereinafter. More specifically the invention relates to compositions of matter made by reacting the acid chlorides of unsaturated acids with cyclic secondary amines.

It has been discovered that acrylyl chloride and methacrylyl chloride will react with cyclic amines, such as morpholine and piperidine to form a new class of compounds which may be represented generically by the following structural formula:

$$CH_2=C-C-N\begin{array}{c}(\overset{H}{C}H_2)_n\\ \phantom{C}\\ \phantom{C}\end{array}\begin{array}{c}CH_2-CH_2\\ \phantom{C}\\ CH_2-CH_2\end{array}X$$

wherein $n$ is a small whole number from 0 to 1, inclusively, and X is a radical of the group consisting of —O—, and —S—.

The new compositions may be prepared by reacting the acid chloride of methacrylic or acrylic acids with the cyclic amines in the presence of pyridine or other tertiary amines. Alternatively the new compounds may be made by the reaction of cyclic amines with acrylic or methacrylic acids or with the esters of said acids. Frequently it is desirable to conduct the reaction in the presence of a mutual solvent for the reagents, for example benzene, toluene and xylene.

The new class of compositions are interesting in that they are polymerizable but do not form copolymers with styrene or butadiene. The monomeric compounds are water soluble and the polymers of the new compounds are soluble in the monomer and in alcohol. The polymers of the new compounds, having a plurality of hetero groups are water soluble and are of particular utility as sizing compounds.

Further details of the preparation and use of the new compounds are set forth with respect to the following examples.

Example 1

A 2-liter, 3-necked flask was equipped with a mechanical stirrer, reflux condenser and a dropping funnel. The flask was charged with 174 grams of morpholine, 158 grams of pyridine and 500 cc. of benzene. While vigorously agitating the contents of the flask 208 grams of methacrylyl chloride was added dropwise over a period of one hour. After the reagents had been combined, the reaction mass was refluxed for one and one-half hours, cooled and the precipitated pyridine hydrochloride removed by filtration. The filtrate was then placed in a distillation flask and a fraction separated at 103.5° C. at 3.5 mm. pressure. It was identified as methacrylyl morpholine having the structural formula:

$$CH_2=C-C-N\begin{array}{c}\phantom{C}\\ \overset{|}{C}H_3\phantom{C}\overset{\|}{O}\end{array}\begin{array}{c}CH_2-CH_2\\ \phantom{C}\\ CH_2-CH_2\end{array}O$$

Example 2

A 50 gram sample of N-methacrylyl piperidine was mixed with 3 grams of t-butyl hydroperoxide and heated for seven days at 120° C. to form a very viscous liquid. A solid polymer was precipitated by pouring the viscous liquid into water. A hard, amber colored resin was thereby obtained.

Example 3

A 100 gram sample of N-methacrylyl morpholine was mixed with 6 grams of t-butyl hydroperoxide and heated at 120° C. for seven days. A viscous solution so obtained was concentrated at 120° C. at 30 mm. of pressure to yield a brittle solid polymer which was soluble in alcohol and water.

Although the invention has been described with respect to specific embodiments, it is not intended that the details thereof, shall be construed as limitations upon the scope of the invention except to the extent incorporated in the following claim.

What is claimed is:

Polymeric N-methacrylyl morpholine.

GEORGE E. HAM.

References Cited in the file of this patent

UNITED STATES PATENTS

| Number | Name | Date |
|---|---|---|
| 615,488 | Knorr | Dec. 6, 1898 |
| 2,166,118 | Bousquet et al. | July 18, 1939 |
| 2,259,164 | Jones | Oct. 14, 1941 |
| 2,288,197 | Kranzlein et al. | June 30, 1942 |
| 2,383,074 | Parker et al. | Aug. 21, 1945 |
| 2,398,283 | Boon | Apr. 9, 1946 |
| 2,401,885 | Semon | June 11, 1946 |
| 2,407,703 | Kaplan | Sept. 17, 1946 |
| 2,411,662 | Martin et al. | Nov. 26, 1946 |
| 2,446,957 | Rosenberg | Aug. 10, 1948 |
| 2,454,092 | Rieveschl | Nov. 16, 1948 |
| 2,456,991 | Prill | Dec. 21, 1948 |
| 2,472,633 | Untermohlen | June 7, 1949 |
| 2,474,820 | Burckhalter et al. | July 5, 1949 |
| 2,480,224 | Custic et al. | Aug. 30, 1949 |
| 2,495,567 | Carmock et al. | Jan. 24, 1950 |

OTHER REFERENCES

Chemical Abstracts, 39 652 (1944).